United States Patent [19] [11] 4,183,145
Piterskikh et al. [45] Jan. 15, 1980

[54] METHOD OF SPRAY-DRYING LIQUID AND PASTELIKE MATERIALS AND INSTALLATION FOR CARRYING SAME INTO EFFECT

[76] Inventors: Georgy P. Piterskikh, ulitsa Garibaldi, 4, korpus 1, kv. 11; Stanislav A. Sukhov, Gostinichny pereulok, 4-a, kv. 71; Ivan I. Rumyantsev, ulitsa 8 Marta, 4, korpus 2, kv. 135; Lev L. Pavlovsky, ulitsa Kedrova, 20, kv. 33; Ivan I. Frolikov, Petrozavodskaya ulitsa, 15, korpus 3, kv. 342, all of Moscow, U.S.S.R.

[21] Appl. No.: 883,157

[22] Filed: Mar. 2, 1978

[51] Int. Cl.[2] .................... F26B 3/08
[52] U.S. Cl. .................... 34/10; 34/57 R; 159/4 R; 432/203
[58] Field of Search .................... 159/4 R, 4 A, 4 J, 45; 34/10, 57 R; 432/203

[56] References Cited

U.S. PATENT DOCUMENTS

| | | | |
|---|---|---|---|
| 3,508,339 | 4/1970 | Neblett et al. | 34/10 |
| 3,618,655 | 11/1971 | Lockwood | 159/4 A |
| 4,082,498 | 4/1978 | Offergeld et al. | 34/10 |

*Primary Examiner*—John J. Camby
*Attorney, Agent, or Firm*—Haseltine, Lake & Waters

[57] ABSTRACT

A method of spray-drying liquid and pastelike materials which comprises atomization of liquid and pastelike materials and subjection thereof to shock wave action, atomization of the material being effected at the point of the maximum shock wave energy characteristic, i.e. amplitude and frequency. The installation for carrying said method into effect comprises a combustion chamber. According to the invention, a device for spraying the material to be dried is installed in the combustion chamber, the latter being connected with a resonance exhaust tube and separated therefrom by a screen made up of perforated elements.

9 Claims, 17 Drawing Figures

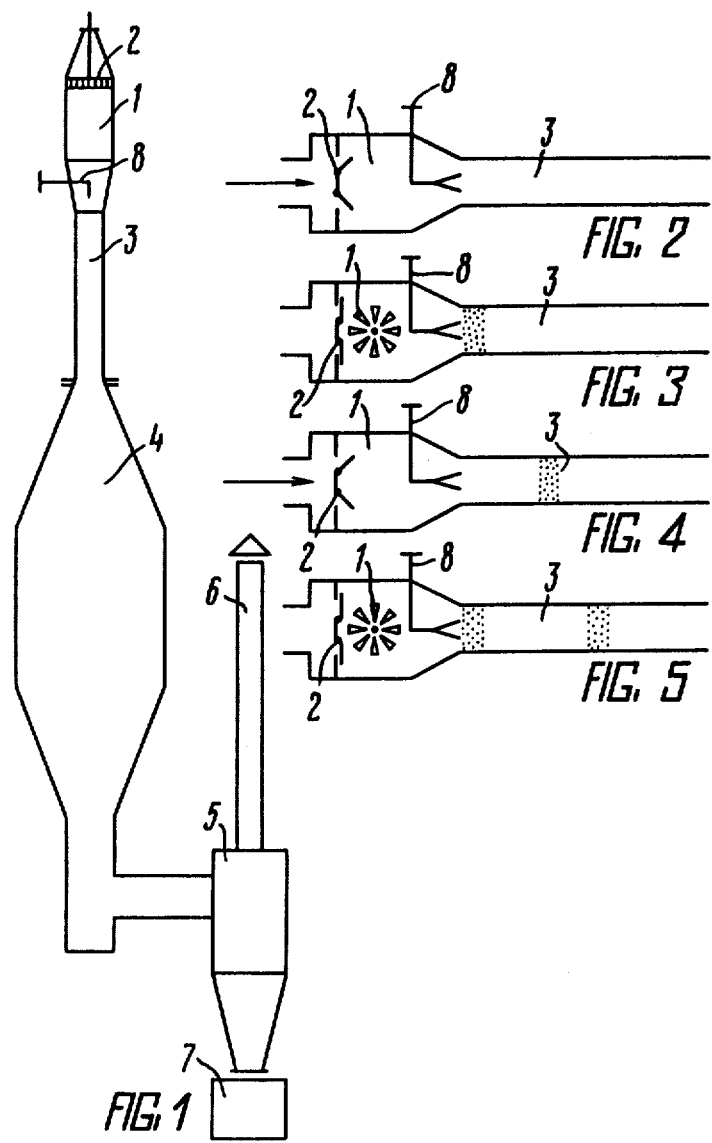

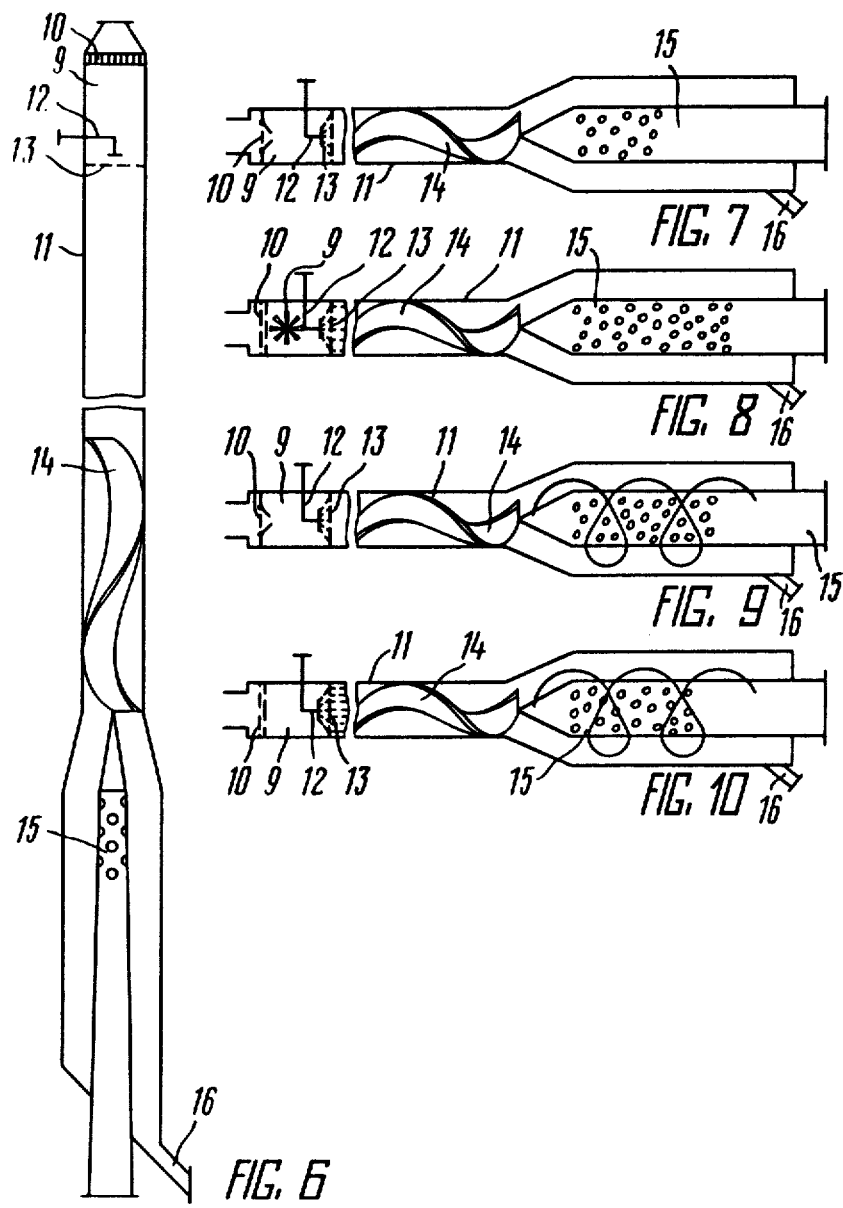

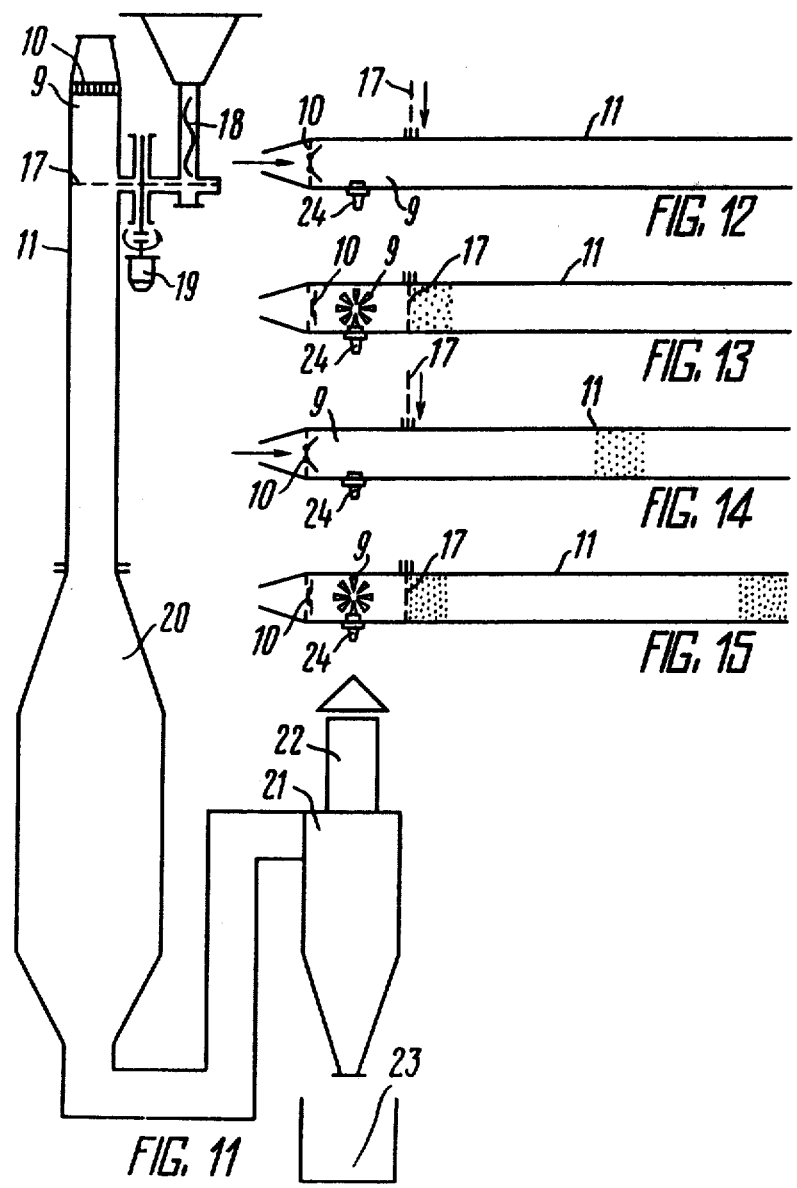

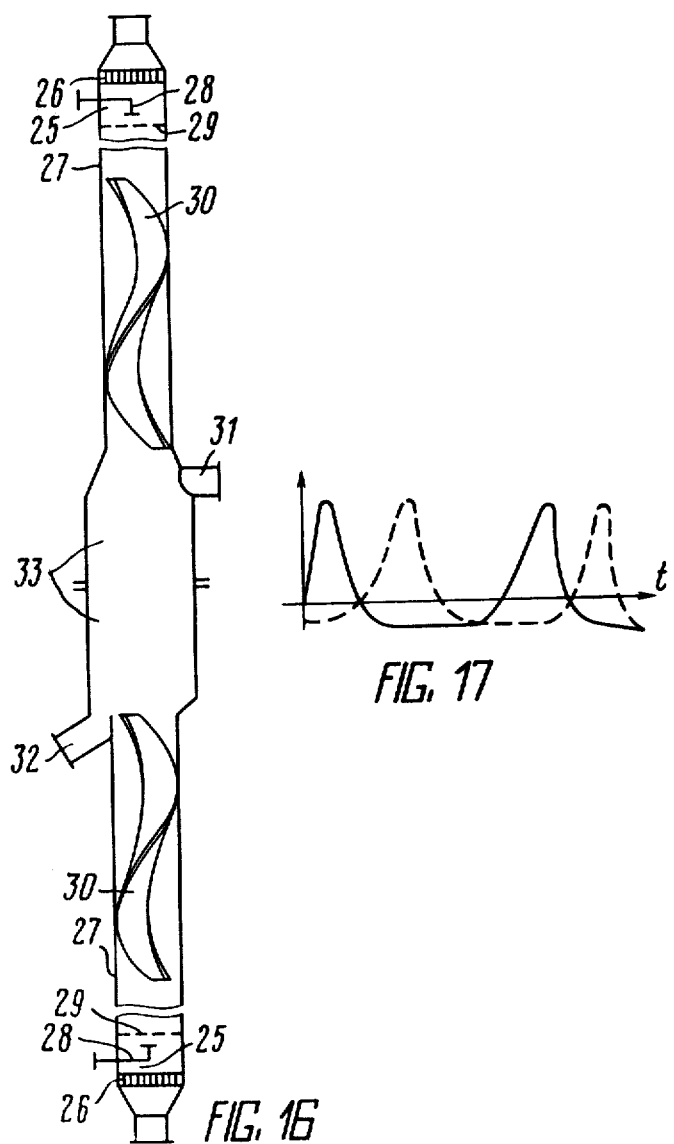

METHOD OF SPRAY-DRYING LIQUID AND PASTELIKE MATERIALS AND INSTALLATION FOR CARRYING SAME INTO EFFECT

The present invention relates to drying engineering, more particularly, to the method of spray-drying liquid and pastelike materials (solutions, suspensions and pastes) and can be used in many fields, including chemical and microbiological industries.

The technique of spray-drying liquid and pastelike materials and installations for carrying out this process are rapidly developing in many advanced industrial countries.

In this connection there rises a problem of devising such installations and methods that will provide, firstly, for increasing their efficiency, inasmuch as the efficiency of the installations known hitherto is yet little, said increase in efficiency being accompanied by high quality of the product obtained; secondly, for using the same equipment for drying different materials, viz. liquid and pastelike; thirdly, for simplifying operation and maintenance of the drying equipment involved; fourthly, for decreasing the specific amount of metal used in manufacturing drying installations and, consequently, cutting down the cost of their manufacture.

Known in the prior art are several methods of drying liquid materials, which methods consist essentially in that a liquid or liquidlike mass atomized into drops becomes dehydrated, while moving in some closed space, by virtue of difference between partial pressures of liquid vapours on the surface of the drops and the surrounding medium.

Spray-drying has advantages over other methods of drying liquid materials in short duration of the process and in providing a considerable phase interaction surface.

Besides, spray-drying makes it possible to use a high-temperature gaseous agent and organize a drying process in a vacuum or inert gases.

With this method, use is made of various drying installations which are equipped with centrifugal, mechanical and pneumatic atomizers and employ a gaseous atomizing and drying agent, viz. compressed air or flue gas, as a working medium.

The aforesaid drying installations require special means for preparation and delivery of the atomizing agent, viz. compressors, blowers, and also means for heating the drying agent, viz. furnaces, air heaters, said means increasing the energy needed for heating materials.

Furthermore, the drying installations under consideration have drying chambers and devices for separating the final product from the drying agent, which substantially increases the overall dimensions of said drying installations and the cost of their manufacture.

Most of the hitherto known methods of spray-drying liquid and pastelike materials and installations for performing this process are based on using the energy of stationary flows wherein the relative velocity of the particles of the material being dried is small and nearly all of said particles are involved in the motion of the gaseous agent, which condition materially reduces the effectiveness of the process and necessitates more energy to be expended for drying liquid and pastelike materials.

Also known in the prior art is a method of spray-drying liquid materials by the use of a high-temperature drying agent, the process being performed by continuously varying the state of said drying agent along with formation of a high-velocity flow and feeding the liquid material into said flow for interaction therewith. The installation working by this method comprises a combustion chamber and a combustion products exhaust duct which has an injector mounted coaxially therewith and designed for feeding the material to be treated (see the description of U.S.S.R. Inventor's Certificate No. 157279, cl. B05B 3/18, 1963).

The aforesaid installation suffers from disadvantages the most serious of which is that it cannot be used for spray-drying pastelike materials because of impossibility of distributing the material uniformly across the flow. Another disadvantage is that the material remains for too short a time in the zone of action of the high-velocity heat carrier flow. A still further disadvantage is that use cannot be made of the extreme temperature of the gaseous agent because of recirculation of the material into the high temperature zone and resultant impairing of the final product.

Also known in the art is a method of spray-drying pastelike materials in counterflows of a high-temperature drying agent. The installation working by this method comprises ducts mounted coaxially to face each other, each duct accommodating a device for feeding the material to be treated (see the description of U.S.S.R. Inventor's Certificate No. 348835, 1969).

Said method and the associated installation are usable for drying liquid and pastelike materials in virtue of a prolonged period during which the material being treated remains in the high-speed flow at the meeting point.

Said installation yet suffers from the disadvantage that the atomizing agent has to be delivered under high pressure, which increases energy expenditure. The extreme temperature of the heat carrier cannot be put to use either due to the fact that the final product is impaired by increasing the period of its stay in the high-temperature zone. This condition leads to increase in the amount of the drying agent by weight, and in consumption of electric power for exhausting the drying agent from the installation, and results in heat being lost together with waste heat carrier.

However, from the power consumption viewpoint, it is more expedient to spray and dry liquid and pastelike materials by periodically changing the state of the gaseous atomizing agent than to intensify this process in a usual way, i.e. at the expense of increasing the mean velocity of the gaseous agent, the method concerned being carried into effect by the use of a pulsating flow of an atomizing and drying agent.

The closest to the technical essence of this idea and also most efficient is the method of spray-drying liquid and pastelike materials by the use of a gaseous agent, more particularly, by periodically changing the state of said gaseous agent along with producing a shock wave, atomizing liquid and pastelike materials and subjecting them to the action of the shock wave. The installation for carrying said method into effect comprises a combustion chamber designed for burning a fuel-air mixture and communicating with a resonance tube in which is mounted an injector for feeding and atomizing the material to be dried. The installation also comprises a device for separating the final product from the waste gaseous agent, said device being constructed in the form of a cyclone and a branch pipe for exhausting said waste gaseous agent, and a drying chamber located between the cyclone and the resonance tube (see U.S. Pat. No. 3,618,655, class 159-4, 1971).

Inasmuch as the variation of the state of the gaseous drying agent in the drying process performed by the method under consideration is characterized by substantial fluctuations of velocity and slight fluctuations of pressure and density, the shock wave produced is weak.

The process of spray-drying liquid materials by a gaseous agent of such parameters and also the lack of synchronization of material feed at the instant when the variation of the state of the gaseous agent reaches the maximum value leads eventually to formation of large particles along with small ones, which hampers their further drying.

The installation which works by said method suffers from a number of disadvantages:

(a) Incomplete use of the energy of burnt fuel due to the fact that the shock wave produced by burning a fuel-air mixture is used at the instant of attenuation thereof, which leads to dissipation of considerable amount of energy.

(b) Formation of large material particles hampering further drying thereof, which condition results from mismatch of material feed and the nature of variation of the parameters of the state of the gaseous atomizing and drying agent.

(c) Low degree of atomizing and drying the material due to the fact that the material is fed continuously, whilst the gaseous atomizing agent is produced in portions.

(d) Short duration of the stay of the atomized material in the resonance tube where it is subjected to the action of the shock wave, which condition prevents the material from being dried more fully.

(e) Large volume of the drying chamber, which sharply reduces the amplitude of pulsation of the gaseous agent and the intensity of the drying process.

(f) Considerable release and dissipation of acoustic energy with resultant incomplete use of the energy of burnt fuel.

(g) Large overall dimensions of the installation and excessive loss of the final product together with the waste agent.

It is an object of the present invention to devise a method and an installation which will provide for spray-drying both liquid and pastelike materials, i.e. will increase the scope of the equipment involved.

It is a further object of the invention to provide an installation for spray-drying liquid and pastelike materials, said installation featuring improved performance and economy of operation and increased efficiency.

It is a still further object of the invention to simplify the construction of the installation as well as the operation and maintenance thereof.

These and other objects are achieved in a method whereby liquid and pastelike materials are sprayed and subjected to the action of a shock wave. According to the invention, the materials involved are sprayed at the point of the maximum energy characteristics of the shock wave.

It is desirable that the point of the maximum amplitude of the shock wave be used as the maximum energy characteristic thereof.

It is possible to use two shock waves with a coaxial front of their propagation, in which case the point of their meeting may be used as the maximum energy characteristic.

It is desirable that the raw material be sprayed in a cyclic manner synchronously with the formation of the shock wave for the material to be uniformly distributed across the flow perpendicular to the direction of shock wave propagation.

This method of spray-drying liquid and pastelike materials provides for the best use of the energy of burnt fuel, increases the rate of drying processes and can be effected in a smaller space with the minimum expenditure of energy.

The objects of the invention are also achieved by providing an installation for carrying said method into effect, which installation comprises a combustion chamber with a resonance tube and has a device for spraying the material to be dried.

According to the invention, the device for spraying the material to be dried is mounted direct in the combustion chamber, whereby provision is made for fuller use of shock wave energy.

To increase the degree of atomization, it is desirable that the combustion chamber be separated from the resonance tube by means of a screen made up of perforated elements designed to retain the raw material at the point of the shock wave maximum energy characteristic during the pause between shock waves.

It is desirable that, for the purpose of increasing the degree of atomizing the material and separating the final product from the waste heat carrier, a helical insert be provided in the resonance tube after the screen, said helical insert prolonging the period of material stay in the zone of shock wave action and providing high phase separation factor.

It is further desirable that, in case of spray-drying high-viscosity pastelike materials or a mix of dissimilar materials or where stringent requirements for intercepting the final product are to be met, use be made of two combustion chambers mounted coaxially, facing each other, and helical inserts be fitted in the resonance tubes, said helical inserts being designed to swirl the flows in opposite directions and to provide for a higher separation factor and prolonged stay of the material at the point of the shock wave maximum characteristic based on frequency.

With this constructional arrangement of the installation, fuller use is made of shock wave energy and, consequently, of the energy of burnt fuel, and atomization becomes finer and uniform, which makes it possible to effect the process of drying liquid and pastelike materials in a smaller space.

Besides, this constructional arrangement obviates the need for devices separating the final product from the waste heat carrier, thereby simplifying the drying process and the construction of the installation.

It is still further desirable that the screen for retaining sprayed material be constructed in the form of a net or made up of band elements of substantially short length, said partition being mounted perpendicular to the axis of the combustion chamber.

It is still further desirable that the helical insert should have a helix angle corresponding to the parameters of the shock wave, viz. the angle of the insert helix should decrease with increasing shock wave energy characteristic.

Now the invention will be described in detail with reference to the accompanying drawings in which:

FIG. 1 illustrates the installation for spray-drying liquid materials.

FIGS. 2, 3, 4 and 5 explain the functioning of the installation illustrated in FIG. 1.

FIG. 6 illustrates the installation for spray-drying liquid materials simultaneously with separating the final product.

FIGS. 7, 8, 9 and 10 explain the functioning of the installation illustrated in FIG. 6.

FIG. 11 illustrates one of the embodiments of the installation for spray-drying pastelike materials.

FIGS. 12, 13, 14 and 15 explain the functioning of the installation illustrated in FIG. 11.

FIG. 16 illustrates another embodiment of the installation for spray-drying pastelike materials simultaneously with separating the final product.

FIG. 17 explains the functioning of the installation illustrated in FIG. 16.

Several embodiments will now be described by way of example in connection with the use of the invention for:

(a) drying liquid materials;
(b) drying liquid materials simultaneously with separating the final product;
(c) drying pastelike products;
(d) drying pastelike products simultaneously with separating the final product.

The installation for spray-drying liquid materials (FIG. 1) comprises an intermittent-firing combustion chamber 1, for example a modified Schmidt duct, with mechanical valves 2 located in the chamber throat, at the entry of a fuel-air mixture. The combustion chamber 1 is connected direct to a resonance exhaust tube 3 which is joined to a drying chamber 4 made in the form of a cylinder. The top portion of the drying chamber 4 is shaped as a frustum of a cone for the purpose of pressure regeneration. The bottom portion of the drying chamber 4 is also shaped as a frustum of a cone and is arranged to provide a high-velocity flow at the entry to cyclone 5 connected therewith. The cyclone 5 terminates in an exhaust pipe 6 at the top and in a final product collector 7 at the bottom. An injector 8 for feeding raw material is installed direct in the combustion chamber 1, in the lower portion thereof, and is constructed in the form of a cooled pipe facing into the opening of the resonance exhaust tube 3.

In order to carry said method into effect, it is necessary to generate a shock wave arising due to a sharp change in the state of the gaseous agent. The material is to be fed at the point where the shock wave has the maximum energy characteristics. The maximum energy characteristic of the shock wave is to be understood herein to mean the full extent of the pressure jumps, i.e. amplitude, and the period of time therebetween, i.e. frequency.

According to the invention, when burning fuel-air mixtures in pulsating combustion chambers rise is given to a shock wave by a local explosion in the combustible mixture.

High pressure builds up in the explosion area wherefrom the shock wave rushes. When passing through a cold combustible mixture, the wave heats it and causes to ignite.

Due to this reason the shock wave front is followed by a combustion area, the latter forming, in conjunction with the shock wave, a detonation wave. Near the centre of the explosion the propagation velocity and the intensity of the wave are very great. However, as the distance from the centre of the explosion increases, detonation wave weakens and its velocity decreases.

Inasmuch as the gases issue from the combustion chamber at sonic speed corresponding to the flow temperature, the shock wave degenerates into an acoustic wave (a weak shock wave) with attendant permanent loss of energy.

The principle of operation of the installation by the method constituting the present invention is as follows:

A fuel-air mixture is fed into the combustion chamber 1 (FIGS. 1 and 2), with the valves 2 open. At the same time raw material is fed into said combustion chamber by using a metering pump in a conventional manner and is discharged through the spraying device 8 towards the opening of the resonance exhaust tube 3, which ends the charging cycle depicted in FIG. 2.

Thereafter the fuel-air mixture is ignited in a conventional manner. Pressure builds up sharply and valves 2 (FIGS. 1 and 3) close.

The combustion gives rise to shock waves which, in conjunction with the combustion product, i.e. the gaseous drying agent, act upon the raw material contained in the combustion chamber 1, whereby said raw material is atomized. The ignition and atomization cycle is explained by FIG. 3. The combustion products together with the atomized product contained therein leave the combustion chamber 1 (FIGS. 1 and 4) via the resonance exhaust tube 3, causing pressure drop in the combustion chamber 1, whereby the valves 2 are opened again and a new charge of the fuel-air mixture is fed into the combustion chamber 1, whilst raw material is fed thereinto continuously. The cycle of combustion chamber recharging and efflux of the previous portion of the gaseous agent is shown in FIG. 4.

The new charge of the fuel-air mixture is re-ignited in the combustion chamber 1 (FIGS. 1 and 5) by residual products of combustion and by the heated combustion chamber walls, which again leads to closing of the valves 2 and atomization of the material contained in the combustion chamber 1. The re-ignition cycle is shown in FIG. 5.

The charging and ignition cycles alternate at a high frequency, i.e. at very short time intervals. Therefore, raw material cannot leave the combustion chamber 1 within the intervals and thus is always fed in the immediate vicinity of the place where the shock wave has the maximum energy characteristic in its amplitude form.

The efflux of the combustion products, i.e. the gaseous atomizing and drying agent, is accompanied by intense heat and mass exchange, removal of the major amount of moisture from the raw material also being effected in the resonance exhaust tube 3 (FIGS. 1, 2, 3, 4 and 5).

Besides, owing to intense cooling of the gaseous agent, conditions exist in the resonance exhaust tube 3 which promote origination of secondary shock waves inasmuch as heat rejection downstream of the critical throat section corresponds to the model of a supersonic thermal nozzle.

Drying can be completed in a conventional way in the drying chamber 4 (FIG. 1). The final product can be separated from the gaseous agent in the cyclone 5 and discharged via the collector 7. The waste drying agent is carried out of the installation through the exhaust pipe 6.

This embodiment of the installation is to be used for treating fluid materials such as true solutions and low-concentration suspensions for the purpose of obtaining the final product in the form of powder with a moderate degree of dispersion.

To obtain finely dispersed powder from solutions and suspensions, for example, to obtain dyes, it is advisable to use the installation illustrated in FIG. 6, which installation spray-dries liquid materials simultaneously with separating the final product.

Referring to FIG. 6, the installation for spray-drying liquid materials simultaneously with separating the final product comprises an intermittent-firing combustion chamber 9, for example, of the Schmidt duct type, with mechanical valves 10 located in the combustion chamber throat, at the entry of a fuel-air mixture. The combustion chamber 9 is connected direct to a resonance exhaust tube 11. A device for spraying the material to be dried, viz. an injector 12, is located inside the combustion chamber 9. A perforated screen 13 is provided under the injector 12 at the junction of the combustion chamber 9 with the resonance exhaust tube 11. A helical insert 14 is installed in the resonance exhaust tube 11 below the perforated screen 13. The helical insert 14 is followed by a waste drying agent exhaust duct 15 which is mounted inside the resonance exhaust tube 11 and coaxially therewith.

The resonance exhaust tube 11 terminates in a branch 16 designed for discharging the final product.

The installation for spray-drying liquid and pastelike thixotropic materials simultaneously with separating the final product operates as follows:

A fuel-air mixture is fed into the combustion chamber 9 (FIGS. 6 and 7) through the valves 10. At the same time, by using a metering pump (not shown) in a conventional manner, raw material is coarsely sprayed through the injector 12 for the purpose of uniformly distributing said material on the perforated screen 13. This ends the charging cycle.

Thereafter the fuel-air mixture is ignited by any method known in the art and the valve 10 (FIGS. 6 and 8) closes, shutting off the delivery of the fuel-air mixture. The combustion of the fuel-air mixture gives rise to detonation and shock waves.

The length of the pre-detonation zone, i.e. the distance from the ignition point to the place where detonation starts, is determined by the portion of the path required for the development of a boundary layer and turbulization of the gas in the compression wave. Due to this reason the perforated screen 13 is installed at the shock wave origination place corresponding to the maximum shock wave energy characteristic in its amplitude form. The shock wave acts upon the raw material lying on the perforated screen 13, atomizing said material. Drying of the material starts simultaneously with atomization thereof.

The cycle of interaction of the raw material and the gaseous agent, i.e. the process of atomization and drying, takes place at the maximum amplitude and synchronously with the formation of the shock wave, since during the intervals between the shock waves the raw material is retained by the perforated screen 13.

After the interaction cycle a vacuum is created in the combustion chamber 9 (FIGS. 6 and 9) due to the kinetic energy of the gases leaving said combustion chamber, the valves 10 open and the combustion chamber is filled with a new charge of the fuel-air mixture, whereas the perforated screen 13 is filled with a new portion of raw material discharged through the injector 12, whereby the re-charge cycle is performed. Then follows the cycle of re-ignition by residual combustion products and another shock wave is produced. The cycle of reignition and interaction of the shock wave with the raw material is shown in FIG. 10.

The aforementioned cycles follow each other at a high frequency, i.e. at time intervals so short that the raw material cannot leave the combustion chamber 9 within the intervals.

Inasmuch as the resonance exhaust tube 11 (FIG. 9) is provided with a helical insert 14, the gas flow is imparted a swirl motion which gives rise to a separation factor, the latter changing the mechanical trajectory of movement of the atomized material and forcing it towards the wall of the resonance exhaust tube 11. The atomized material is slowed down, whereby the stay of the material in the zone of shock wave action is prolonged. The movement of the material is accompanied by intense heat and mass exchange, which promotes the removal of the major amount of moisture from the raw material.

Owing to a high separation factor, final drying of the material and separation thereof from the drying agent take place in the swirl zone formed by the walls of the resonance exhaust tube 11 (FIG. 6) and the duct 15 located coaxially therewith and designed for carrying out the waste drying agent. The final product is carried out of the installation by way of the branch 16.

To spray-dry high-viscosity pastelike materials or mixtures of dissimilar materials which are difficult to transport, it is desirable that use be made of the embodiment of the installation illustrated in FIG. 11.

Referring to FIG. 11, the installation for spray-drying pastelike materials comprises an intermittent-firing combustion chamber 9 with mechanical valves 10 located in the combustion chamber throat, at the entry of a fuel-air mixture. The combustion chamber 9 is connected direct to a resonance exhaust tube 11. A perforated screen 17 is installed inside the resonance exhaust tube 11 at the junction with the combustion chamber 9. The perforated screen 17 has a device 18 for feeding raw pastelike material and is provided with a mechanism 19 arranged to impart said screen a reciprocating or rotary motion. The resonance exhaust tube 11 is connected to a drying chamber 20. The top portion of the drying chamber 20 is shaped as a frustum of a cone for the purpose of pressure regeneration. The bottom portion of the drying chamber 20 is also shaped as a frustum of a cone and is arranged to provide a high-velocity flow at the entry to a cyclone 21 connected therewith. The cyclone 21 terminates in an exhaust pipe 22 at the top and in a final product collector 23 at the bottom.

The principle of operation of the installation by the method of spray-drying pastelike materials is as follows:

A fuel-air mixture is fed into the combustion chamber 9 (FIG. 12) through the valves 10. At the same time the raw pastelike material is applied by means of the device 18 to the perforated screen 17 which has been moved out of the combustion chamber 9 by means of the mechanism 18. This ends the charging cycle.

Thereafter the fuel-air mixture is ignited in a conventional manner, for example, by means of an igniter plug, and the valves 10 close, shutting off the delivery of the fuel-air mixture.

The combustion gives rise to detonation and shock waves. The length of the pre-detonation zone, i.e. the distance from the ignition point to the place where detonation starts, is determined by the portion of the path required for the development of a boundary layer and turbulization of the gas in the compression wave.

Due to this reason the preforated screen 17 (FIG. 13) is introduced at the shock wave origination place corresponding to the maximum shock wave energy characteristic in its amplitude form. The shock wave acts upon the raw material lying on the perforated screen 17, atomizing said material. Drying of the material starts simultaneously with atomization thereof. Thus the cycle of interaction of the raw material and the shock wave, i.e. the atomization cycle, is performed.

The cycle of interaction between the raw material and the gaseous agent takes place at the maximum amplitude and synchronously with the formation of the shock wave, since the portion of the raw material applied to the perforated screen 17 is introduced into the combustion chamber 9 during the interval between shock waves.

After the interaction cycle a vacuum is created in the combustion chamber 9 (FIG. 14) due to the kinetic energy of the gases leaving said combustion chamber, the valves 10 open and the combustion chamber is filled with a new charge of the fuel-air mixture, whereas the perforated screen 17 is moved out of the combustion chamber and is filled with a new portion of raw material for the re-charge cycle to be performed. After the perforated screen 17 (FIGS. 11 and 15) has been introduced into the combustion chamber 9, the fuel-air mixture is re-ignited for the cycle of re-ignition and interaction of the shock wave and the raw material to be performed.

The aforementioned cycles follow each other at a regulated frequency which is governed by the frequency of introducing the perforated screen 17 into the combustion chamber 9.

The movement of the material in the resonance exhaust tube 11 is accompanied by intense heat and mass exchange, which promotes the removal of the major amount of moisture from the raw material.

The final drying of the material and the separation thereof from the drying agent are effected in the drying chamber 20 (FIG. 11) and in the cyclone 21. The waste drying agent is carried out through the exhaust pipe 22. The final product is accumulated in the collector 23.

In the cases where the final product has to have low residual moisture content or the raw pastelike material contains bound moisture which is difficult to remove and high degree of purification of the waste heat carrier is required, it is recommended that use be made of the embodiment of the installation shown diagrammatically in FIG. 16.

Referring to FIG. 16, the installation for spray-drying pastelike materials simultaneously with separating the final product comprises two intermittent-firing combustion chambers 25, for example, of the Schmidt duct type, mounted coaxially to face each other. Each combustion chamber has mechanical valves 26 located in the chamber throat, at the entry of a fuel-air mixture. Said combustion chambers are connected direct to resonance exhaust tubes 27 also mounted coaxially and facing towards each other. Inside each combustion chamber 25 is mounted an injector 28 for spraying raw material. A perforated screen 29 is installed under each injector 28 at the junction of the combustion chamber 25 with the resonance exhaust tube 27. Besides, helical inserts 30 are mounted in the resonance exhaust tubes 27 below and some distance away from the perforated screens 29. A branch 31 for discharging the waste drying agent is provided downstream of the helical insert 30 of one of the combustion chambers 25. A branch 32 for discharging the final product is provided downstream of the helical insert 30 of the other combustion chamber 25.

The portions of the resonance exhaust tubes 27 downstream of the helical inserts 30 form a swirl chamber 33.

The principle of operation of the installation by the method of spray-drying pastelike materials with obstinate moisture simultaneously with separating the final product is as follows:

The raw material is divided into two flows and is fed through the injectors 28 onto the perforated screen 29 in each of the intermittent-firing combustion chambers 25, whereby the material is delivered into the place of the maximum shock wave energy characteristic in its amplitude form. The principle of operation and the sequence of the cycles in each of the combustion chambers completely correspond to those of the embodiment illustrated and explained in FIGS. 6, 7, 8, 9 and 10.

However, when drying materials containing bound moisture, it is desirable that use be made of two shock waves moving towards each other and of the installation illustrated in FIG. 16 in order to provide for complete drying of the raw material by virtue of performing the final drying process in the zone of the maximum shock wave energy characteristic in its frequency form, i.e. where the two shock waves meet.

The use of the embodiment of the installation illustrated in FIG. 16 provides for superposition of two shock waves in the swirl zone 33 and higher frequency of the resultant shock wave in said zone, whereby the process of drying the material is intensified. The effect of combining the oscillations is shown in FIG. 17. Simultaneously with the final drying, the final product is separated in the swirl zone 33 (FIG. 16) due to a high separation factor set up in the swirl counterflows. The final product is discharged through the branch 32, the waste drying agent is discharged through the branch 31.

The economy effectiveness of the method constituting the present invention is as follows:

In spray-drying, with the same 1:1 ratio by weight between the raw material and the gaseous agent, the average size of particles obtained by the method constituting the present invention is twice smaller. Decreasing particle size 2 to 5 times is equivalent to decreasing the overall dimensions of the drying chamber 4 to 25 times, which results from reduction of particle travel required for complete drying.

The method constituting the present invention makes it possible to use higher temperatures of the gaseous agent, thereby reducing fuel consumption by 10 to 50 percent.

The installations for carrying into effect said method enable the processes of atomizing and drying the material to be intensified by virtue of fuller use of the shock wave energy in proportion to the amplitude of variation of the parameters of the state of the gaseous agent, viz. the Mach number in the incident flow. On this account the aggregate intensity of the spray-drying process can be increased 10 times and more as compared with the prior art installation. Consequently, the overall dimensions of the installation can be decreased 10 times and more, the manufacturing and operating costs being decreased accordingly.

What is claimed is:

1. A method of spray-drying liquid and pastelike materials in a combustion chamber having a exhaust means in communication with said chamber and spray means for introducing said materials into said chamber, said method comprising the steps of: atomizating of liquid and pastelike materials; and subjecting the atomized material to the action of a shock wave, whereby, atomizating of the material is effected at the point of the maximum energy characteristics of said shock wave.

2. A method as claimed in claim 1, wherein the point of the maximum energy characteristic of the shock wave is the point of the maximum amplitude thereof.

3. A method as claimed in claim 1, comprising the steps of: subjecting said atomized material to two shock waves with a coaxial front of their propagation, and drying of said material at a point of meeting and interaction of said two shock saves defined as a point of shock wave maximum energy characteristic in its frequency form.

4. A method as claimed in claim 1, including the steps of: atomizating said material in a cyclic manner in synchronism with said shock wave.

5. An apparatus for spray-drying liquid and pastelike materials, which installation comprising: a combustion chamber, a resonance exhaust tube communicating with said combustion chamber, and means for spraying the material to be dried, said means being installed directly into the combustion chamber.

6. An apparatus as claimed in claim 5, wherein: the resonance exhaust tube is separated from the combustion chamber by a screen formed of perforated elements which provide means feeding the material to a point of a shock wave maximum amplitude formed in said chamber.

7. An apparatus as claimed in claim 5, wherein; said screen is provided with a mechanism for reciprocation thereof, in the plane perpendicular to the axis of said combustion chamber to enable cyclic feed of portions of the material and distribution thereof, in the plane perpendicular to the direction of a shock wave.

8. An installation as claimed in claim 5, wherein a helical insert is installed in said resonance exhaust tube downstream of said screen, which helical insert enables the material being dried to remain for a longer period in the zone of shock wave action.

9. An apparatus for spray-drying liquid and pastelike materials, which apparatus comprises; two combustion chambers; two interconnected resonance exhaust tubes, one of said tubes being connected with one of said combustion chambers and the other tube being connected with the other combustion chamber; two screens, each of which is installed at the junction of one of said combustion chambers with one of said resonance exhaust tubes; two helical inserts, each of which is installed in the respective resonance exhaust tube, which helical inserts swirl the flows in opposite directions and enable the material being dried to stay for a longer period at the point of the shock wave maximum frequency characteristic.

* * * * *